(12) United States Patent
Shaked et al.

(10) Patent No.: US 11,849,417 B2
(45) Date of Patent: *Dec. 19, 2023

(54) BLIND FAST NETWORK SYNCHRONIZATION ALGORITHM FOR REDUCING LTE PUBLIC SAFETY PRODUCT COSTS

(71) Applicant: Parallel Wireless, Inc., Nashua, NH (US)

(72) Inventors: Ido Shaked, Alfei Menashe (IL); Efi Dror, Kadima-Zoran (IL)

(73) Assignee: Parallel Wireless, Inc., Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/845,895

(22) Filed: Jun. 21, 2022

(65) Prior Publication Data

US 2022/0338144 A1 Oct. 20, 2022

Related U.S. Application Data

(63) Continuation of application No. 16/984,140, filed on Aug. 3, 2020, now Pat. No. 11,368,931.

(60) Provisional application No. 62/882,179, filed on Aug. 2, 2019.

(51) Int. Cl.
*H04W 56/00* (2009.01)
*H04W 84/04* (2009.01)

(52) U.S. Cl.
CPC ....... *H04W 56/004* (2013.01); *H04W 56/002* (2013.01); *H04W 84/042* (2013.01)

(58) Field of Classification Search
CPC H04W 56/002; H04W 56/004; H04W 84/042
See application file for complete search history.

(56) References Cited

U.S. PATENT DOCUMENTS

| | | | |
|---|---|---|---|
| 8,837,373 B2* | 9/2014 | Gan | H04B 7/155 370/328 |
| 10,129,283 B1* | 11/2018 | Briggs | H04W 12/126 |
| 10,326,632 B2* | 6/2019 | Cui | H04L 27/2659 |
| 2011/0176483 A1* | 7/2011 | Palanki | H04W 56/0015 370/328 |
| 2013/0028161 A1* | 1/2013 | Maeda | H04W 72/20 370/329 |
| 2014/0119261 A1* | 5/2014 | Wang | H04W 72/0446 370/312 |

(Continued)

*Primary Examiner* — Stephen J Clawson
(74) *Attorney, Agent, or Firm* — Michael Y. Saji (57) ABSTRACT

Systems and methods are provided for providing blind fast network synchronization for reducing LTE public safety products costs, comprising, in one embodiment: determining if location setup is required to mitigate timing offset due to propagation delay from the synchronization source and adjusting downlink timing, and when location setup is required then providing one of manual setup in terms of timing samples, limited power RACH based on SIB2 parameters, and based on observed time difference of arrival and position reference signal; coordinating network listening periods based on graphs and hash function to avoid common silence for two or more neighboring eNodeBs; and providing continuous synchronization using blind carrier estimation.

15 Claims, 7 Drawing Sheets

(56) References Cited

U.S. PATENT DOCUMENTS

| | | | |
|---|---|---|---|
| 2015/0215879 A1* | 7/2015 | Zhu | H04W 56/0015 370/350 |
| 2016/0192304 A1* | 6/2016 | Yi | H04W 52/0206 370/328 |
| 2017/0347279 A1* | 11/2017 | Bejerano | H04W 72/30 |

* cited by examiner

BLIND FAST NETWORK SYNCHRONIZATION ALGORITHM FOR REDUCING LTE PUBLIC SAFETY PRODUCT COSTS

CROSS-REFERENCE TO RELATED APPLICATIONS

This application is a continuation of U.S. application Ser. No. 16/984,140, filed Aug. 3, 2020, which claims priority under 35 U.S.C. § 119(e) to U.S. Provisional Pat. App. No. 62/882,179, filed Aug. 2, 2019, titled "Blind Fast Network Synchronization Algorithm For Reducing LTE Public Safety Product Costs", each of which is hereby incorporated by reference in its entirety for all purposes. This application hereby incorporates by reference U.S. patent application Ser. No. 15/241,060, entitled "Cell ID Disambiguation" and filed Aug. 18, 2016, which itself is a non-provisional conversion of, and claims the benefit of priority under 35 U.S.C. § 119(e) to U.S. Provisional Pat. App. No. 62/206,666, filed Aug. 18, 2015 with title "Cell ID Disambiguation," each hereby incorporated by reference in its entirety. As well, U.S. Pat. No. 8,867,418 and U.S. Pat. App. No. 20140133456 are also hereby incorporated by reference in their entireties. The present application hereby incorporates by reference U.S. Pat. App. Pub. Nos. US20110044285, US20140241316; WO Pat. App. Pub. No. WO2013145592A1; EP Pat. App. Pub. No. EP2773151A1; U.S. Pat. No. 8,879,416, "Heterogeneous Mesh Network and Multi-RAT Node Used Therein," filed May 8, 2013; U.S. Pat. No. 8,867,418, "Methods of Incorporating an Ad Hoc Cellular Network Into a Fixed Cellular Network," filed Feb. 18, 2014; U.S. patent application Ser. No. 14/777,246, "Methods of Enabling Base Station Functionality in a User Equipment," filed Sep. 15, 2016; U.S. patent application Ser. No. 14/289,821, "Method of Connecting Security Gateway to Mesh Network," filed May 29, 2014; U.S. patent application Ser. No. 14/642,544, "Federated X2 Gateway," filed Mar. 9, 2015; U.S. patent application Ser. No. 14/711,293, "Multi-Egress Backhaul," filed May 13, 2015; U.S. Pat. App. No. 62/375,341, "S2 Proxy for Multi-Architecture Virtualization," filed Aug. 15, 2016; U.S. patent application Ser. No. 15/132,229, "MaxMesh: Mesh Backhaul Routing," filed Apr. 18, 2016, each in its entirety for all purposes, respectively. This application also hereby incorporates by reference in their entirety each of the following U.S. Pat. applications or Pat. App. Publications: US20150098387A1; US20170055186A1; US20170273134A1; US20170272330A1; and Ser. No. 15/713,584.

BACKGROUND

Cellular base stations utilize precise sync data. In particular, 3G and LTE use at least GPS-synced clocks, and TD-LTE and LTE-Advanced Networks further need correct time and phase data. The problem is further complicated with base stations that move (for example, provided in a public safety vehicle's trunk).

In an orthogonal frequency division multiplexed (OFDM) system, carrier frequency offset (CFO) produces the same phase drift at all subcarrier indices, while sampling frequency offset (SFO) introduces a phase rotation which increases linearly with the subcarrier index. The impact of CFO and SFO are the loss of the orthogonality of the subcarrier, which results in inter-carrier interference (ICI) and the rotation of constellation points. To mitigate the impact of CFO and SFO, a two-step process is known: 1) Estimation of CFO and SFO; and 2) Correction of CFO and SFO based on the estimation.

Certain implementations of blind carrier synchronization are known. One such example is as described in U.S. Pat. No. 10,326,632, which is hereby incorporated herein by reference in its entirety. The disclosed method separates out each of the paired I and Q information signals that are present in the frequency-multiplexed OFDM signal before computing cross-correlation according to the Park method. This results in a method that permits blind frequency synchronization even for frequency-multiplexed signals.

SUMMARY

Systems and methods for blind fast network synchronization algorithm for reducing LTE public safety products costs are described. In one embodiment, a method for providing blind fast network synchronization for reducing LTE public safety products costs includes determining if location setup is required to mitigate timing offset due to propagation delay from the synchronization source and adjusting downlink timing, and when location setup is required then providing one of manual setup in terms of timing samples; and limited power RACH based on SIB2 parameters. The method also includes coordinating network listening periods based on graphs and hash function to avoid common silence for two or more neighboring eNodeBs. The method further includes providing continuous synchronization using blind carrier estimation.

A method is disclosed for providing blind fast network synchronization for reducing LTE public safety products costs, comprising: determining if location setup may be required to mitigate timing offset due to propagation delay from the synchronization source and adjusting downlink timing, and when location setup may be required then providing one of manual setup in terms of timing samples, limited power RACH based on SIB2 parameters, and based on observed time difference of arrival and position reference signal; coordinating network listening periods based on graphs and hash function to avoid common silence for two or more neighboring eNodeBs; and providing continuous synchronization using blind carrier estimation.

When location setup may be required, providing manual setup in terms of timing samples is contemplated. When location setup may be required, providing limited power RACH based on SIB2 parameters is contemplated. When location setup may be required, providing location setup based on an observed time difference of arrival and position reference signal is contemplated. Coordinating listening periods may comprise: for each node x in the network, let x, y, z denote enbs in the network: if x has neighbors in syncg and x may be synced, select x as a synchronization node and set Tx SFN and DL only SF; for all y neighboring nodes of x in SyncG set to listening mode in the same SFN and SF; for all z!=x neighboring nodes of all y in IntG set to silent in the same SFN and SF; and mark all y nodes as synced for the drift_interval.

In a further embodiment, a node is disclosed for providing blind fast network synchronization for reducing LTE public safety products costs, comprising: the node determines if location setup may be required to mitigate timing offset due to propagation delay from the synchronization source and adjusting downlink timing, and when location setup may be required then providing one of manual setup in terms of timing samples, limited power RACH based on SIB2 parameters, and based on observed time difference of arrival and position reference signal; the node coordinates network listening periods based on graphs and hash function to avoid common silence for two or more neighboring eNodeBs; and the node may provide continuous synchronization using blind carrier estimation.

The node determines location setup may be required and may provide manual setup in terms of timing samples. The node may provide location setup by providing limited power RACH based on SIB2 parameters. The node may provide location setup based on an observed time difference of arrival and position reference signal. The coordinating listening periods may comprise: for each node x in the network, let x, y, z enbs may be denoted in the network: if x has neighbors in syncg and x may be synced, x may be selected as a synchronization node and set Tx SFN and DL only SF; for all y neighboring nodes of x in SyncG set to listening mode in the same SFN and SF; for all z!=x neighboring nodes of all y in IntG set to silent in the same SFN and SF; and mark all y nodes as synced for the drift_interval.

In a further embodiment, a non-transitory computer-readable medium is disclosed, containing instructions for providing blind fast network synchronization for reducing LTE public safety products costs which, when executed, cause a node to perform steps comprising: determining if location setup may be required to mitigate timing offset due to propagation delay from the synchronization source and adjusting downlink timing, and when location setup may be required then providing one of manual setup in terms of timing samples, limited power RACH based on SIB2 parameters, and based on observed time difference of arrival and position reference signal; coordinating network listening periods based on graphs and hash function to avoid common silence for two or more neighboring eNodeBs; and providing continuous synchronization using blind carrier estimation.

When location setup may be required, providing manual setup in terms of timing samples is contemplated. When location setup may be required, providing limited power RACH based on SIB2 parameters is contemplated. When location setup may be required, providing location setup based on an observed time difference of arrival and position reference signal is contemplated. Coordinating listening periods may comprise: for each node x in the network, let x, y, z denote enbs in the network: if x has neighbors in syncg and x may be synced, select x as a synchronization node and set Tx SFN and DL only SF; for all y neighboring nodes of x in SyncG set to listening mode in the same SFN and SF; for all z!=x neighboring nodes of all y in IntG set to silent in the same SFN and SF; and mark all y nodes as synced for the drift_interval.

DETAILED DESCRIPTION

A clock synchronization source enables the replacement of the expensive XO with a much cheaper one, by using Network Listening Mode (e.g., according to 3GPP TR 36.922 Rel. 14) based on Blind Carrier Estimation (U.S. Pat. No. 10,326,632, 2017) for enhanced synchronization accuracy which would allow multi-hop eNB network synchronization in low SNR scenarios.

Blind Carrier Synchronization

A known method is disclosed, relevant to certain embodiments, comprising: downconverting a received orthogonal frequency division multiplexed (OFDM) signal to baseband; identifying, from the downconverted received signal, a series of OFDM symbols in the time domain; performing a fast Fourier transform (FFT) on a block of several time domain samples to turn the time domain OFDM symbols into frequency domain OFDM symbols, one sample per subcarrier in the received OFDM signal; computing a cross-correlation between in-phase and quadrature samples in each subcarrier and for each frequency domain OFDM symbol, wherein the cross-correlation may be computed as a sum of products of either squares or absolute values of the in-phase and quadrature samples; and summing the computed cross-correlation across the series of symbols and across all subcarriers to determine a frequency offset for the received OFDM signal.

The method may be performed at a radio receiver. A quantity of the series of symbols may be based on an arbitrarily-configured number sufficient to cause a synchronization algorithm to converge to within a desired error range. The summed cross-correlation may be a cumulative phase measurement. A subset of the received symbols that may be repeated symbols that have been inserted for carrier synchronization may be discarded. The method may be initiated at device power on, upon signal acquisition, at scheduled intervals, or upon detecting a loss of synchronization, with a same number of input samples being used each time the method may be performed. The received OFDM signal may be quadrature amplitude modulation (QAM) modulated. The received OFDM signal may be a Wi-Fi, WiMAX, WiGig, or Long Term Evolution (LTE) signal. The series of OFDM symbols in the time domain may be a subset of the received OFDM symbols.

Determining the frequency offset may further comprise time averaging and integrating a product of either squares of or absolute values of the in-phase signal and the quadrature signal.

Determining the frequency offset may further comprise calculating:

$$\sum_m \sum_l \{|I_R(l,m)|^2 |Q_R(l,m)|^2\}$$

where m refers to each subcarrier, l refers to each OFDM symbol, I_R (l,m) refers to an in-phase part of an mth subcarrier in an lth OFDM symbol, and Q_R (l,m) refers to a quadrature part of the mth subcarrier in the lth OFDM symbol.

Alternatively, determining the frequency offset may further comprise calculating:

$$\sum_m \sum_l \{|I_R(l, m)| \cdot |Q_R(l, m)|\}$$

where m refers to each subcarrier, l refers to each OFDM symbol, I_R (l,m) refers to an in-phase part of an mth subcarrier in an lth OFDM symbol, and Q_R (l,m) refers to a quadrature part of the mth subcarrier in the lth OFDM symbol.

The presently described blind fast network synchronization algorithm provides fast sync, up to a single sub frame; 3GPP TDD and LTE-A standard compliance in terms of phase alignment, and frequency error; no HW modification is required; only software modification is required; and the method can operate down to 0 db SNR. First sync lock obtained below 1 sec; frequency/time tracking accuracy of several ppbs; and timing offset is location independent.

Next, a method for integrating this synchronization algorithm into a telecommunications network is described, in accordance with some embodiments. The presently described algorithm can be used as a single node (or more) in the network is synchronized to a GPS. All other nodes in the network are stipulated to be within the receiving range of at least one synchronized node which obtains its synchronization either by a GPS or other synchronized node (multihop). The presently described algorithm can also be used in a floating network—a single node is predefined to a free running mode, while all other obtaining their synchronization by utilizing this algorithm (multi-hop).

Key advantages over standard Network Listening Mode (NLM) include: Accuracy. Accurate and fast synchronization without GPS/1588, down to several PPBs; Supports all LTE-A features (CoMP, eICIC) requirements in terms of accuracy; MultiHop: Can sync an entire eNB site based on a single Macro eNB, rather than a single hop; Vast environments: Synchronization is possible in low SNR scenarios, and 2G/3G Macro cells can also be used as a synchronization source to allow vast range of deployments; Unlimited distance (Macro uplink range limited); Simplicity, since Simple to implement—no HW modification is required, and Allows a simple tradeoff between clock stability and sync periodicity (to reduce CAPEX in exchange for UL throughput); Compliance with 3GPP standards—No proprietary protocol is required.

Figure 1:
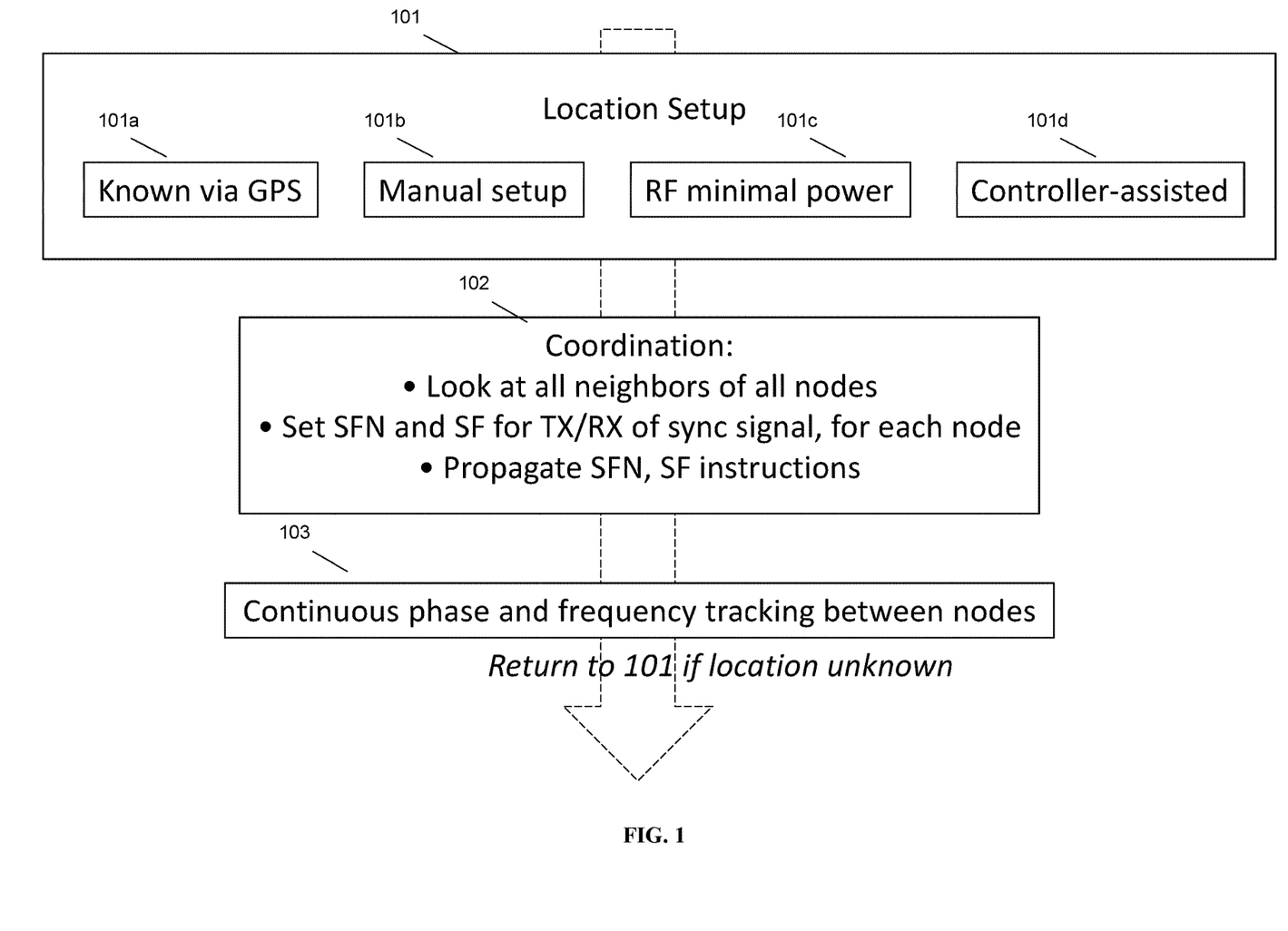
FIG. 1 is a flowchart of a method for synchronization, in accordance with some embodiments.

FIG. 1 is a flowchart of a method for synchronization, in accordance with some embodiments. FIG. 1 shows an overview of the phases and stages of the method.

The algorithm consists of three main phases, in some embodiments.

Phase 1: Location Setup (101)

Location setup is required to mitigate timing offset caused by propagation delay from synchronization source and adjust the downlink timing. In case the location is known from previous GPS signal this algorithm phase should be skipped (101a).

There are 3 main methods to achieve accurate location method:

Manual setup in terms of TS (Timing samples) (101b). Distance to macro or sync source could be manually input.

Limited power RACH based on SIB2 parameters by considering RF frontend limitation of minimal power (101c). In this method, target power should be set according to SIB2 parameter. If the required PRACH power is below the eNB capability (for example if the minimal power is 0 dBM, and the required is −30 dBM) a digital back-off is required with each reduced bit of digital amplitude results in 6 dB power decrease. By retaining T.A. value, up to 0.52 µs accuracy.

RAN Controller & UE assisted (101d)-based on OTODA (observed time difference of arrival) and PRS (position reference signal). RAN controller could be an RNC, a vRNC, a coordinating server as described herein, a 5G RIC, etc. The OTODA and PRS would be sent to the RAN controller and the RAN controller would perform the determination.

Note: In case of GPS signal loss (holdover state), location setup (phase 1) is not required, since eNB is already synchronized and the XO only need to be adjusted to overcome its drift in terms of frequency and phase. Holdover requirements are not standard; they vary depending on the type, complexity, and operator' requirements. Public safety networks mostly require stringent hold over time upon losing the GPS signal. Due to the above requirement an expensive XO (crystal oscillator) is mandatory for mobile eNB product.

Phase 2: Coordination (102)

Coordination of Network listening periods to maximize estimation accuracy, based on connected Graphs and/or Hash function to avoid common silence of two or more neighboring eNBs, and reduce interferences of common synchronization signals. Goal: for each node's synchronization SFN (subframe number) and SF (subframe), shall be only one neighbor which transmits during that time. Equivalents are well-understood in other radio access technologies such as 3G.

Algorithm Steps

Each node monitors PCIs and RSRPs of neighboring nodes and reports it to the RAN controller (RANC)

RANC shall construct two graphs—an interference graph and a synchronization graph. Examples are shown in FIG. 2 and FIG. 3.

Figure 2:
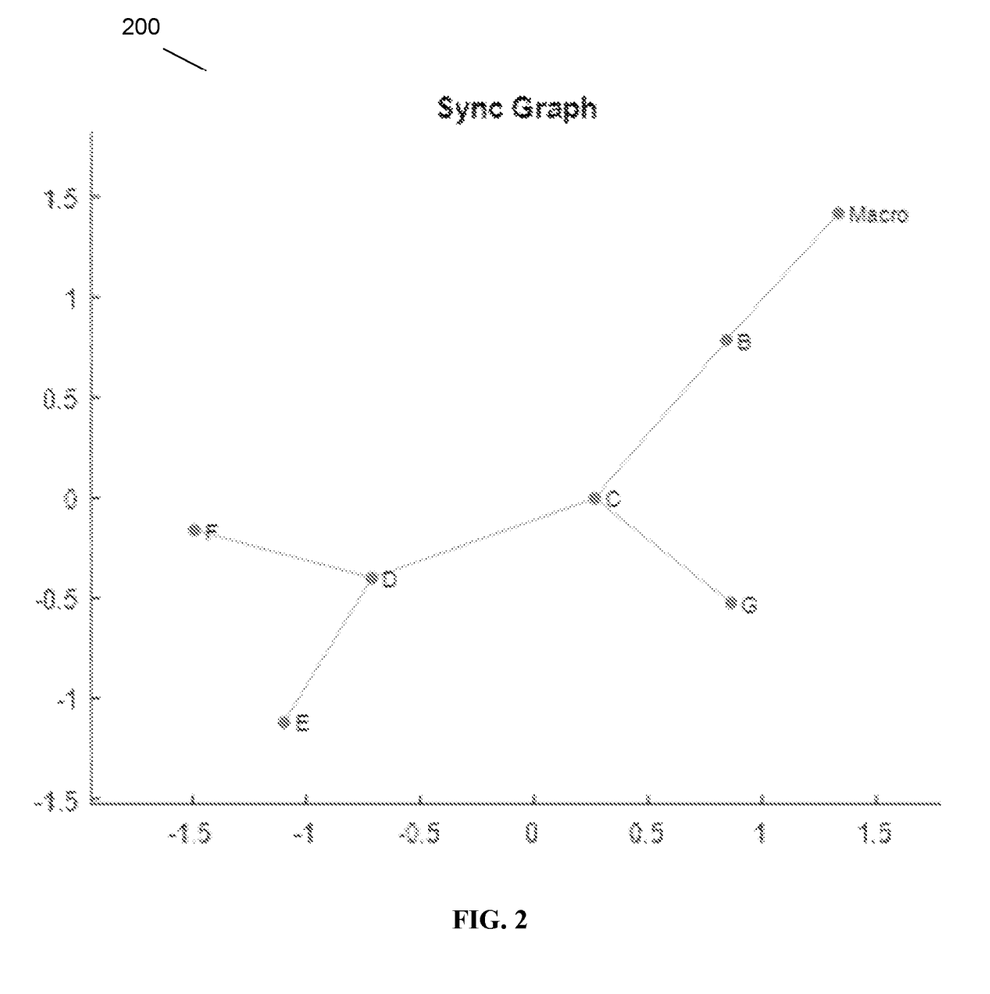
FIG. 2 is a synchronization graph for coordination of synchronization sources, in accordance with some embodiments.

FIG. 2 shows a synchronization graph SyncG 200 in which an edge is constructed for each node and its highest-ranking synchronization source, in accordance with some embodiments. In the shown graph, a macro is shown as the highest-ranking sync source in the shown graph because it has GPS, while the other nodes do not have GPS in the example shown. Higher-ranking sync sources propagate sync to lower-ranked sources, in some embodiments. Ranking is described below. Note that sync is not limited to a single hop, as are some competing solutions.

Figure 3:
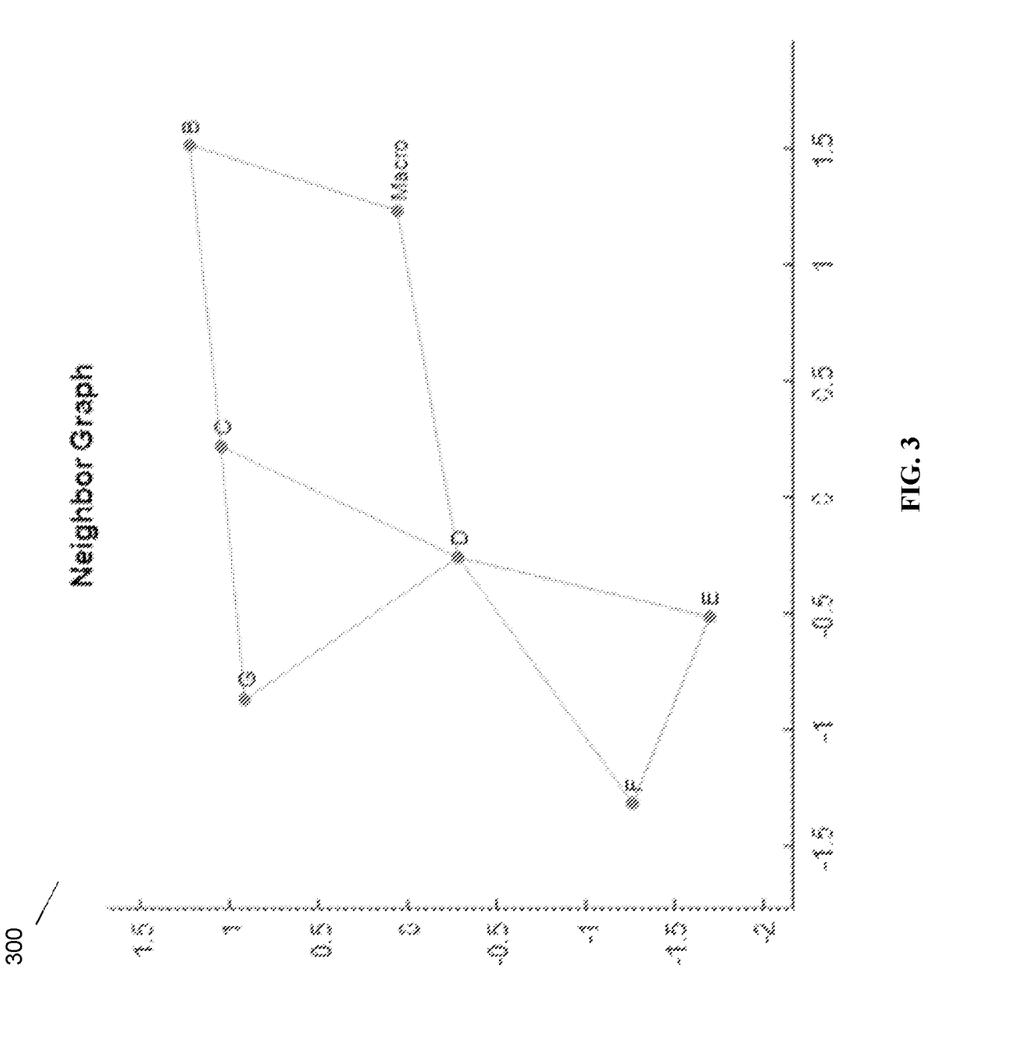
FIG. 3 is a neighbor graph for interference coordination of synchronization sources, in accordance with some embodiments.

FIG. 3 shows an interference graph IntG 300 of all intra frequency neighboring nodes. The goal is to not interfere with other nodes as they propagate sync to each other.

The sync process shall be performed periodically, with the period (known as drift_interval) being determined by the necessary accuracy of sync (could be less than 1 sec or several seconds). Upon each drift_interval the following procedure shall be followed:

For each node x in the network:
Let x, y, z denote eNBs in the network.
If x has neighbors in SyncG and x is synced:
Select x as a synchronization node and set Tx SFN and DL only SF (0 or 5 in LTE).
For all y neighboring nodes of x in SyncG set to listening mode in the same SFN and SF.

For all z!=x neighboring nodes of all y in IntG set to silent in the same SFN and SF.

Mark all y nodes as synced for the drift_interval.

The SFN and SF instructions are propagated using the RAN controller, in some embodiments.

In some embodiments, one of the nodes can act as the RAN controller.

Prioritization

Prioritization of synchronization sources (Ranking) based on stratum level, RSRP, BW and interference graph, calculated by the RAN controller and should exploit the following guidelines:

Ranking in a scale of 1 to 100 with highest priority set to 1 according to the following formula:

Stratum level S [1:3]

RSRP R [−60:−120]

Bandwidth B [5,10,15,20]

Floor($\alpha$*(S/3)−$\beta$*(R+60)/60−$\lambda$*B/20), with $\alpha$=50, $\beta$=40, $\lambda$=10

Phase 3: Continuous Phase and Frequency Tracking (103)

Continuous synchronization by employing Blind Carrier Estimation method (e.g. U.S. Pat. No. 10,326,632), at some nodes or at each node, in some embodiments, once every drift_interval, using the SFN, SF instructions from the RAN controller determined in step 102.

I/Q samples carrier estimation and correction performed once every drift_interval depends on oscillator source stability.

Synchronization should be done on DL subframe only (0/5). It is noted that multiple synchronization sources allow durability, however they might cause interference, thus the use of the coordination phase 102.

Carrier estimation will be used to adjust clock source accuracy and correct DL and UL time drift.

During the estimation period (length–1 subframe), no UE shall be served in the cell on TX so that the sync source can be received.

Can work as low as 0 db SNR, will not work in case overlapping coverage doesn't exist. In case of unknown location (distance from synchronization source) due to GPS loss and movement, algorithm's phase 1 shall be executed.

Figure 4A:
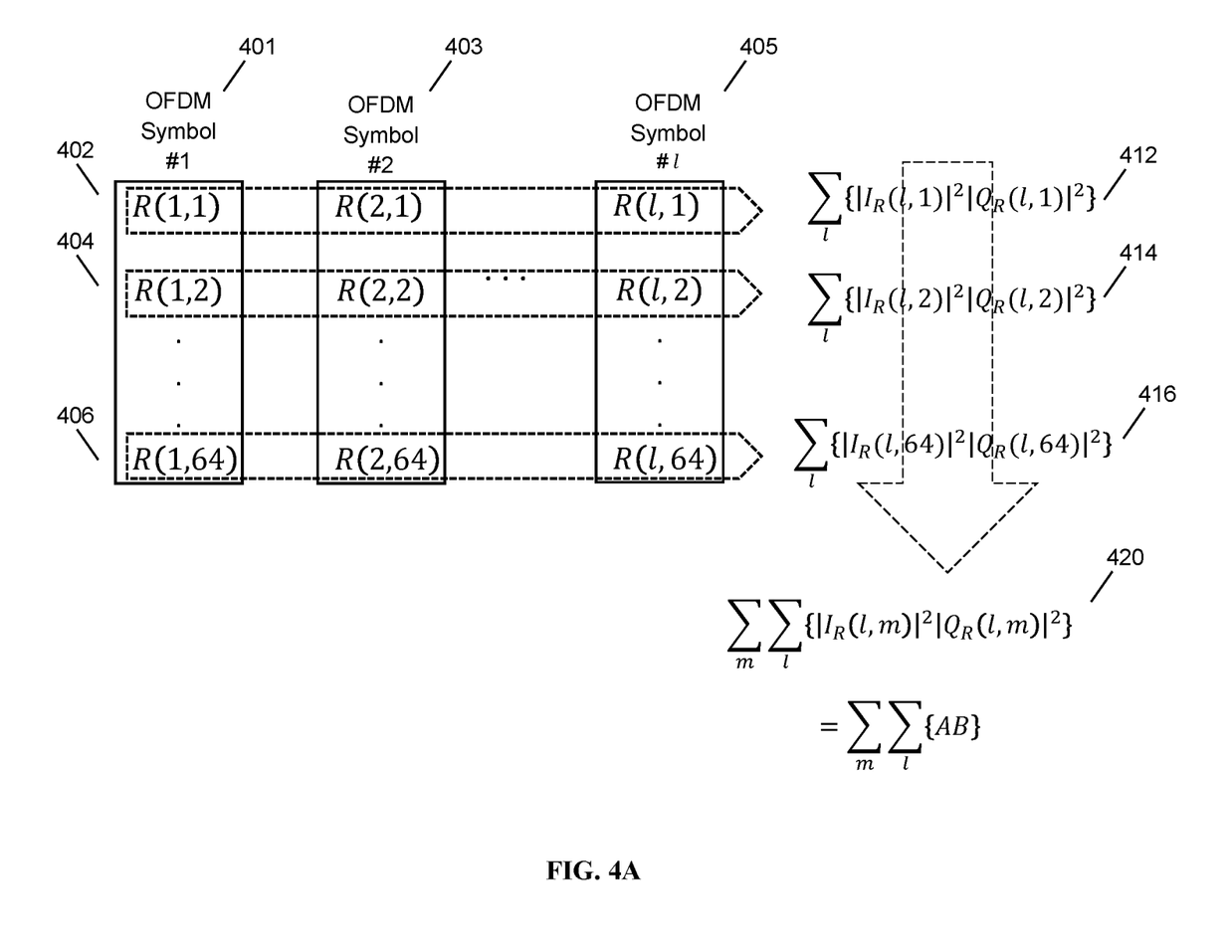
FIG. 4A is a schematic illustration of the operations of a blind carrier synchronization method, in accordance with some embodiments.

FIG. 4A is a schematic illustration of the operations of the following equation from U.S. Ser. No. 10/326,632:

$$\max_{\varepsilon' \in [f_1; f_2]} J(\varepsilon') = \sum_m \sum_l \{AB\} = \sum_m \sum_l \{I_R(l, m, \varepsilon')\}^2 \{Q_R(l, m, \varepsilon')\}^2 \quad (20)$$

Where [f1, f2] is the frequency range of interest.

OFDM symbol #1 401 is made up of multiple frequency subcarriers 402, 404, 406, with subcarrier 402 having subcarrier number 1 and subcarrier 406 having subcarrier number 64, the highest subcarrier number in this diagram. Similarly, OFDM symbol #2 403 and all symbols up to and including OFDM symbol #1 405 are also made up of 64 subcarriers.

On the right of the diagram, equation 412 reflects the fact that the squared absolute values (i.e., the cross-correlation according to Park) of every symbol having subcarrier number 1 are summed. Equations 414 and 416 reflect the summation of cross-correlations of every subcarrier across each OFDM symbol, with equation 420 reflecting the summation of cross-correlations across both every subcarrier and every symbol. In some embodiments, squared absolute values may be used; in other embodiments, absolute values may be used without squaring, according to Park.

Figure 4B:
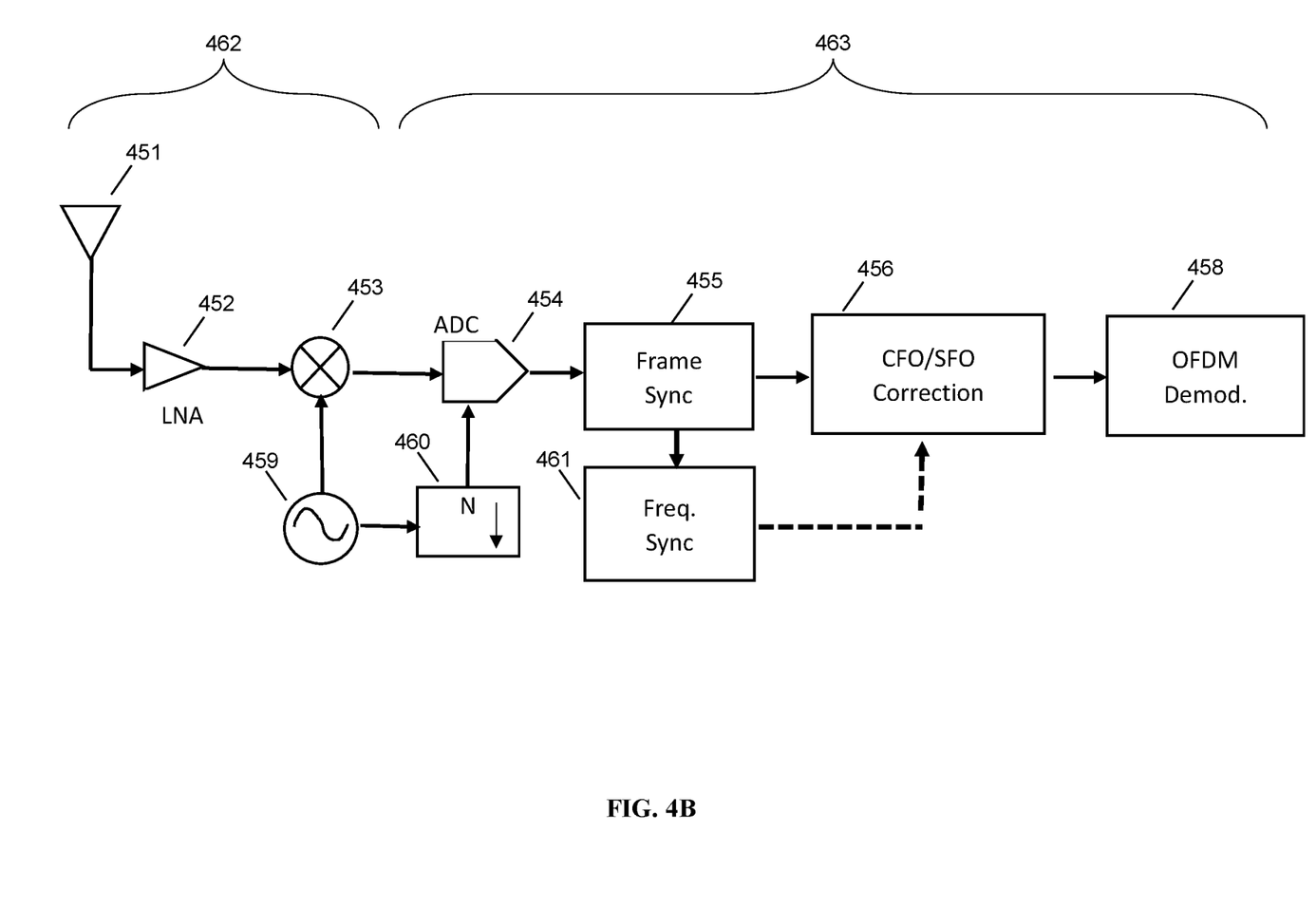
FIG. 4B is a schematic system diagram, in accordance with some embodiments.

FIG. 4B is a schematic system diagram, in accordance with some embodiments. FIG. 4B is a schematic system diagram for a node providing blind carrier estimation sync, in accordance with some embodiments. Fine frequency offset tuning could instead be applied during a data communication period as part of a frame synchronization and channel equalization procedure. Analog baseband receive chain 462 consists of antenna 451, low noise amplifier 452, and mixer 453. Mixer 453 receives a carrier frequency from oscillator 459 and subtracts it from the received signal to downconvert the signal to baseband. Oscillator 459 has a frequency offset, but is not able to receive a compensation signal. In this case, coarse synchronization can be performed between the transmitter and receiver in the initial communication stage using the method proposed herein or using a conventional method. An analog baseband signal is sent to ADC 454.

Digital baseband 463 consists of ADC 454, which receives the analog signal and converts it to a digital signal; fractional N frequency synthesizer 460, which converts oscillator 459's signal to a sampling rate for ADC 454; frame synchronization module 455, for identifying OFDM frame edges; CFO/SFO correction module 456, using the method in FIG. 4A; and OFDM demodulator 458, which outputs bits to the main processor of the digital device (not shown).

Frequency synchronization module 461 receives digital symbols from frame sync module 455 and identifies frequency offset through the cross-correlation method described herein. However, since the oscillator does not receive the offset correction signal, it is sent to a new module, CFO/SFO correction module 456, which applies correction to the signal in the digital domain before it is sent to the OFDM demodulator 458.

In some embodiments, where adjusting the local oscillator is not feasible, CFO and SFO correction can be done in the digital domain. This embodiment is shown. However, adjusting the local oscillator is also possible and is enabled using a similar system, in which an oscillator 459 is directly adjusted by freq. sync module 451.

Figure 5:
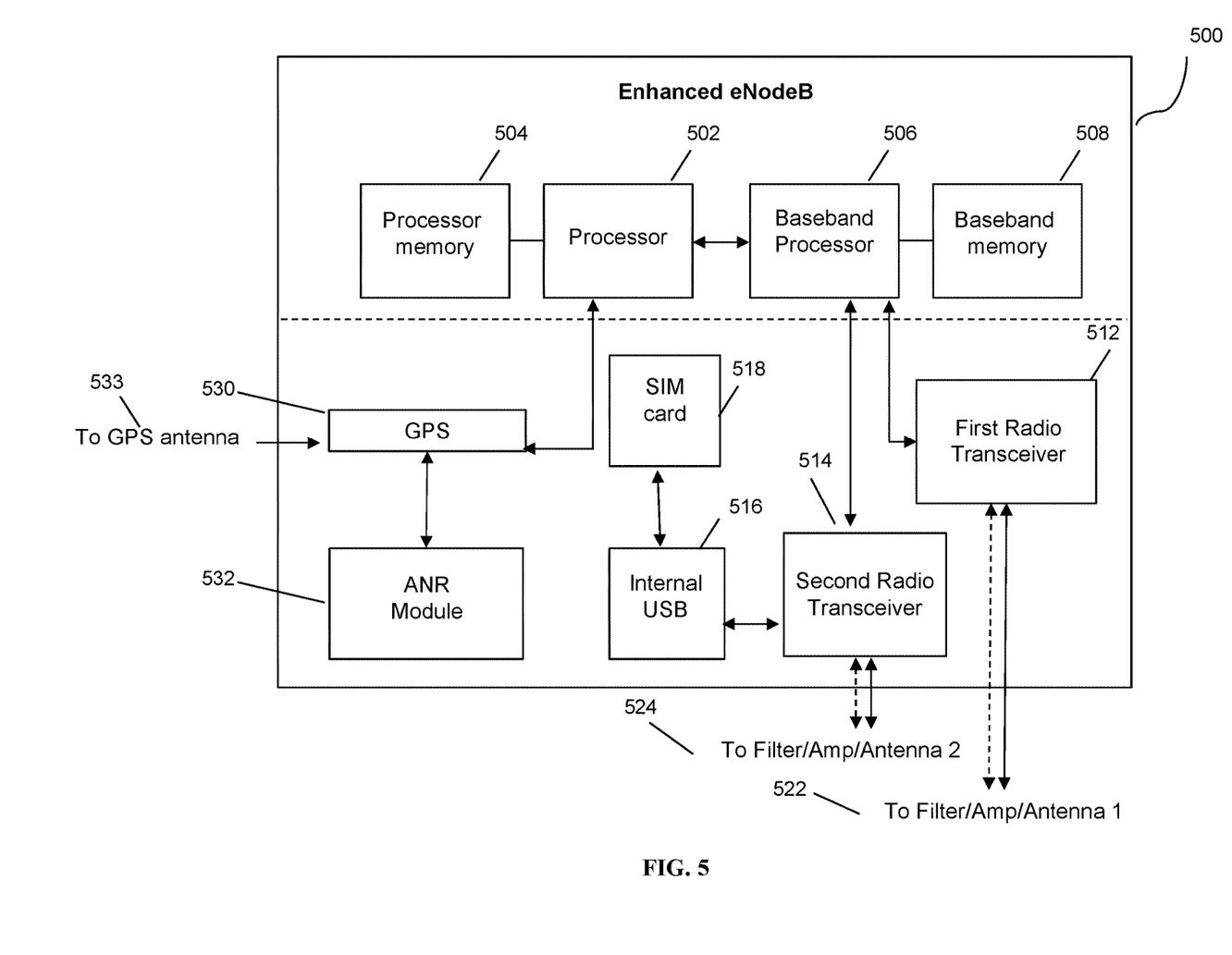
FIG. 5 is an enhanced eNodeB for performing the methods described herein, in accordance with some embodiments.

FIG. 5 is an enhanced eNodeB for performing the methods described herein, in accordance with some embodiments. Shown above is an enhanced eNodeB for performing the methods described herein, in accordance with some embodiments. eNodeB 500 may include processor 502, processor memory 504 in communication with the processor, baseband processor 506, and baseband processor memory 508 in communication with the baseband processor.

Mesh network node 500 may also include first radio transceiver 512 and second radio transceiver 514, internal universal serial bus (USB) port 516, and subscriber information module card (SIM card) 518 coupled to USB port 516. In some embodiments, the second radio transceiver 514 itself may be coupled to USB port 516, and communications from the baseband processor may be passed through USB port 516. The second radio transceiver may be used for wirelessly backhauling eNodeB 500.

Processor 502 and baseband processor 506 are in communication with one another. Processor 502 may perform routing functions, and may determine if/when a switch in network configuration is needed. Baseband processor 506 may generate and receive radio signals for both radio transceivers 512 and 514, based on instructions from processor 502. In some embodiments, processors 502 and 506 may be on the same physical logic board. In other embodiments, they may be on separate logic boards.

Processor 502 may identify the appropriate network configuration, and may perform routing of packets from one network interface to another accordingly. Processor 502 may use memory 504, in particular to store a routing table to be used for routing packets. Baseband processor 506 may perform operations to generate the radio frequency signals for transmission or retransmission by both transceivers 510 and 512. Baseband processor 506 may also perform operations to decode signals received by transceivers 512 and 514. Baseband processor 506 may use memory 508 to perform these tasks.

The first radio transceiver 512 may be a radio transceiver capable of providing LTE eNodeB functionality, and may be capable of higher power and multi-channel OFDMA. The second radio transceiver 514 may be a radio transceiver capable of providing LTE UE functionality. Both transceivers 512 and 514 may be capable of receiving and transmitting on one or more LTE bands. In some embodiments, either or both of transceivers 512 and 514 may be capable of providing both LTE eNodeB and LTE UE functionality. Transceiver 512 may be coupled to processor 502 via a Peripheral Component Interconnect-Express (PCI-E) bus, and/or via a daughtercard. As transceiver 514 is for providing LTE UE functionality, in effect emulating a user equipment, it may be connected via the same or different PCI-E bus, or by a USB bus, and may also be coupled to SIM card 518. First transceiver 512 may be coupled to first radio frequency (RF) chain (filter, amplifier, antenna) 522, and second transceiver 514 may be coupled to second RF chain (filter, amplifier, antenna) 524.

SIM card 518 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 500 is not an ordinary UE but instead is a special UE for providing backhaul to device 500.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 512 and 514, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 502 for reconfiguration.

A GPS module 530 may also be included, and may be in communication with a GPS antenna 532 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 532 may also be present and may run on processor 502 or on another processor, or may be located within another device, according to the methods and procedures described herein.

Other elements and/or modules may also be included, such as a home eNodeB, a local gateway (LGW), a self-organizing network (SON) module, or another module.

Additional radio amplifiers, radio transceivers and/or wired network connections may also be included. While the described system may be used in an LTE public safety product providing LTE services to public safety personnel, a same or similar system providing LTE or any combination of 2G/3G/4G/5G/Wi-Fi to any and all cellular users could also be used, in some embodiments, with the methods and systems of the present disclosure. Any reference to LTE or public safety is meant as example only and is intended to be non-limiting. For example, although one use case is public safety with mobile base stations, the same methods and systems could be used for fixed outdoor base stations (thereby saving on not requiring GPS for each node); or, for indoor small cells with limited GPS access and without requiring 1588 PTP time synchronization; or, for GPS backup for outdoor cells, including mini/macro cells. Either TDD or FDD are understood to be able to be supported, in some cases using a different path for DL or TX as required.

Figure 6:
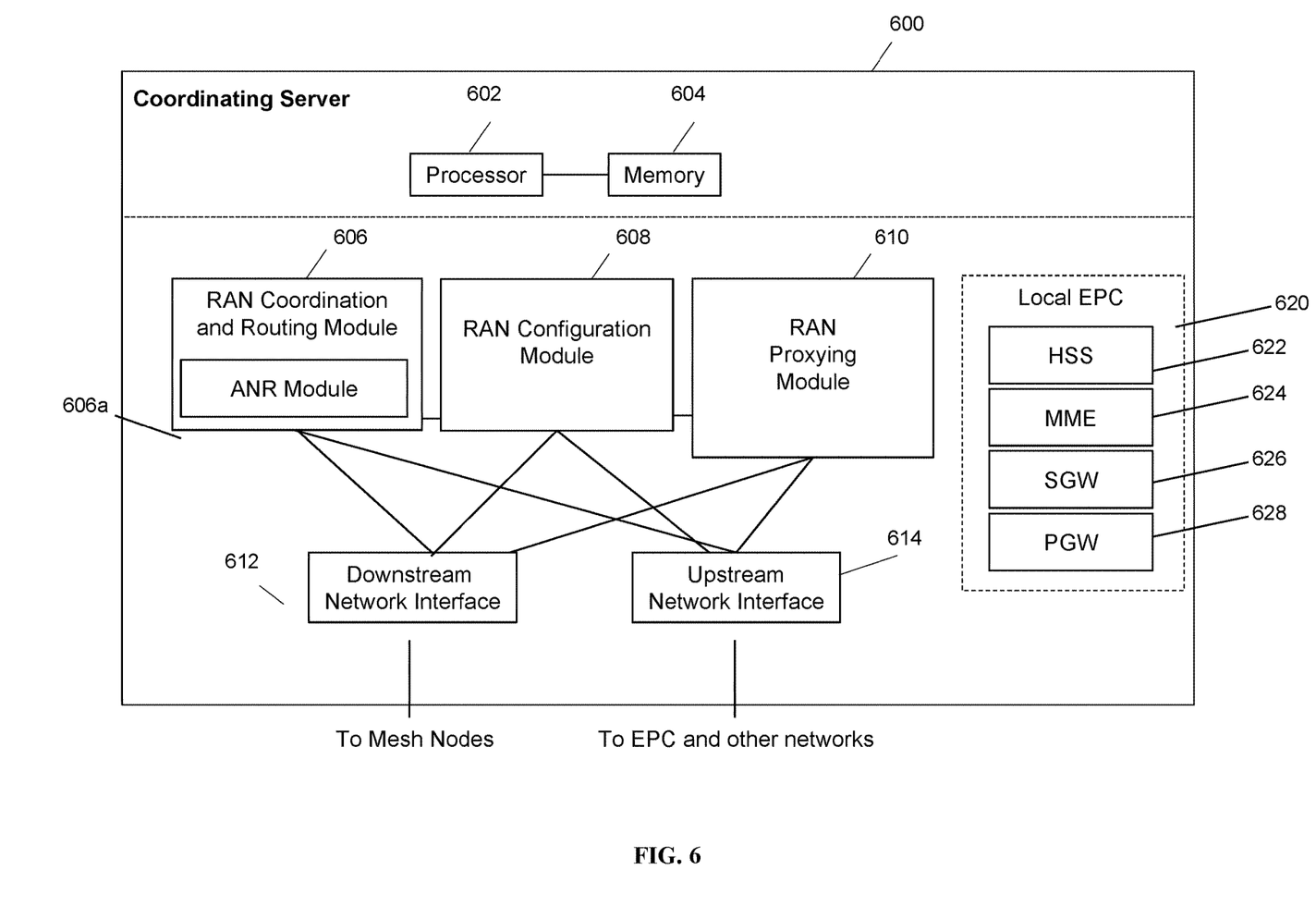
FIG. 6 is a coordinating server for providing services and performing methods as described herein, in accordance with some embodiments.

FIG. 6 is a coordinating server for providing services and performing methods as described herein, in accordance with some embodiments. Coordinating server 600 includes processor 602 and memory 604, which are configured to provide the functions described herein. Also present are radio access network coordination/routing (RAN Coordination and routing) module 606, including ANR module 606a, RAN configuration module 608, and RAN proxying module 610. The ANR module 606a may perform the ANR tracking, PCI disambiguation, ECGI requesting, and GPS coalescing and tracking as described herein, in coordination with RAN coordination module 606 (e.g., for requesting ECGIs, etc.). In some embodiments, coordinating server 600 may coordinate multiple RANs using coordination module 606. In some embodiments, coordination server may also provide proxying, routing virtualization and RAN virtualization, via modules 610 and 608. In some embodiments, a downstream network interface 612 is provided for interfacing with the RANs, which may be a radio interface (e.g., LTE), and an upstream network interface 614 is provided for interfacing with the core network, which may be either a radio interface (e.g., LTE) or a wired interface (e.g., Ethernet).

Coordinator 600 includes local evolved packet core (EPC) module 620, for authenticating users, storing and caching priority profile information, and performing other EPC-dependent functions when no backhaul link is available. Local EPC 620 may include local HSS 622, local MME 624, local SGW 626, and local PGW 628, as well as other modules. Local EPC 620 may incorporate these modules as software modules, processes, or containers. Local EPC 620 may alternatively incorporate these modules as a small number of monolithic software processes. Modules 606, 608, 610 and local EPC 620 may each run on processor 602 or on another processor, or may be located within another device.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

The present application contemplates the use of a blind frequency synchronization method. However, the inventors have appreciated that a non-blind method could be used as well and intend that the present application could be read accordingly wherever applicable. Any frequency synchronization method that meets a particular frequency accuracy threshold, for example, less than 16 ppb, would be able to be used. Various methods could be used to reduce the drift of the underlying synchronization chip in the system as well, including temperature control, digital logic, etc. as known in the art. Various types of synchronization crystals, for example, VCXOs, could be used. Resync using the sync methods described herein would be performed as often as necessary to provide the necessary frequency accuracy, depending on the underlying frequency error of the system.

Although the above systems and methods are described using GPS, other positioning methods could be present and/or used within the scope of the present disclosure, such as GLONASS, TDOA, GALILEO, BDS, IRNSS, etc., and GPS is intended to mean any other positioning system where appropriate.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration);

(4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

The invention claimed is:

1. A method for providing blind fast network synchronization for reducing Long Term Evolution (LTE) public safety products costs, comprising:
   determining if a location setup is required to mitigate timing offset due to propagation delay from the synchronization source and adjusting downlink timing, and when location setup is required then providing one of manual setup in terms of timing samples, limited power Random Access Channel (RACH) based on System Information Block Type 2 (SIB2) parameters, and based on observed time difference of arrival and position reference signal;
   coordinating network listening periods based on graphs and hash function to avoid common silence for two or more neighboring eNodeB s;
   the network includes at least one first node, at least one second node and at least one third node in the network:
   when the at least one first node has neighbors in a synchronization graph (SyncG) and the at least one first node is synchronized, select the at least one first node as a synchronization node and set transmission (Tx) Single Frequency Networks (SFN) and Down Load (DL) only Single Frequency (SF); and
   providing continuous synchronization using blind carrier estimation.

2. The method of claim 1 wherein when location setup is required then providing manual setup in terms of timing samples.

3. The method of claim 1 wherein when location setup is required then providing limited power RACH based on SIB2 parameters.

4. The method of claim 1 wherein when location setup is required then providing location setup based on an observed time difference of arrival and position reference signal.

5. The method of claim 1 wherein when coordinating listening periods comprises:
   for all the at least one second node which are neighboring nodes of the at least one first node in SyncG set to listening mode in the same SFN and SF;
   for all neighboring nodes of the at least one second node in IntG set to silent in the same SFN and SF; and
   mark all the at least one second nodes as synchronized for the drift_interval.

6. A node for providing blind fast network synchronization for reducing Long Term Evolution (LTE) public safety products costs, comprising:
   an analog baseband receive chain in communication with a digital baseband;
   wherein a node determines if location setup is required to mitigate timing offset due to propagation delay from the synchronization source and adjusting downlink timing, and when location setup is required then providing one of manual setup in terms of timing samples, limited power Random Access Channel (RACH) based on System Information Block Type 2 (SIB2) parameters, and based on observed time difference of arrival and position reference signal;
   the node coordinates network listening periods based on graphs and hash function to avoid common silence for two or more neighboring eNodeB s;
   the network includes at least one first node, at least one second node and at least one third node in the network:
   when the at least one first node has neighbors in a synchronization graph (SyncG) and the at least one first node is synchronized, select the at least one first node as a synchronization node and set transmission (Tx) Single Frequency Networks (SFN) and Down Load (DL) only Single Frequency (SF); for each at least one first node in the network, let x, y, z denote eNBs in the network:
   the node provides continuous synchronization using blind carrier estimation.

7. The node of claim 6 wherein the node determines location setup is required and provides manual setup in terms of timing samples.

8. The node of claim 6 wherein the node provides location setup by providing limited power RACH based on SIB2 parameters.

9. The node of claim 6 wherein when the provides location setup based on an observed time difference of arrival and position reference signal.

10. The node of claim 6 wherein when coordinating listening periods comprise:
    for all the at least one second node which are neighboring nodes of the at least one first node in SyncG set to listening mode in the same SFN and SF;
    for all neighboring nodes of the at least one second node in IntG set to silent in the same SFN and SF; and
    mark all the at least one second nodes as synchronized for the drift_interval.

11. A non-transitory computer-readable medium containing instructions for providing blind fast network synchronization for reducing Long Term Evolution (LTE) public safety products costs which, when executed, cause a node to perform steps comprising:
    determining if location setup is required to mitigate timing offset due to propagation delay from the synchronization source and adjusting downlink timing, and when location setup is required then providing one of manual setup in terms of timing samples, limited power Random Access Channel (RACH) based on System Information Block Type 2 (SIB2) parameters, and based on observed time difference of arrival and position reference signal;
    coordinating network listening periods based on graphs and hash function to avoid common silence for two or more neighboring eNodeB s;
    the network includes at least one first node, at least one second node and at least one third node in the network:
    when the at least one first node has neighbors in a synchronization graph (SyncG) and the at least one first node is synchronized, select the at least one first node as a synchronization node and set transmission (Tx) Single Frequency Networks (SFN) and Down Load (DL) only Single Frequency (SF);

provide continuous synchronization using blind carrier estimation.

12. The non-transitory computer-readable medium of claim 11 further containing instructions wherein when location setup is required then providing manual setup in terms of timing samples.

13. The non-transitory computer-readable medium of claim 11 further containing instructions wherein when location setup is required then providing limited power RACH based on SIB2 parameters.

14. The non-transitory computer-readable medium of claim 11 further containing instructions wherein when location setup is required then providing location setup based on observed time difference of arrival and position reference signal.

15. The non-transitory computer-readable medium of claim 11 further containing instructions wherein coordinating listening periods comprises:
   for all the at least one second node which are neighboring nodes of the at least one first node in SyncG set to listening mode in the same SFN and SF;
   for all neighboring nodes of the at least one second node in IntG set to silent in the same SFN and SF; and
   mark all the at least one second nodes as synchronized for the drift_interval.

* * * * *